April 28, 1959 H. E. BESTE 2,884,561

SYNCHRONIZING SIGNAL GENERATOR

Filed June 17, 1957 3 Sheets-Sheet 1

INVENTOR
HAROLD E. BESTE
BY Darby & Darby
ATTORNEYS.

INVENTOR
HAROLD E. BESTE

BY Darby & Darby

ATTORNEYS

INVENTOR
HAROLD E. BESTE
BY Darby + Darby
ATTORNEYS 2,884,561
Patented Apr. 28, 1959

2,884,561

SYNCHRONIZING SIGNAL GENERATOR

Harold Edward Beste, Verona, N.J., assignor to Allen B. Du Mont Laboratories, Inc., Clifton, N.J., a corporation of Delaware Application June 17, 1957, Serial No. 666,090

6 Claims. (Cl. 315—21)

This invention relates to circuitry for producing television signals, and more particularly to that portion of the circuit which produces the synchronizing signals.

In the past, the sync. signal generator has been one of the most complex circuits in the system, requiring, in addition, so many tubes that a great deal of power was necessary. Since many television transmitting systems are now being airborne, or mounted on mobile equipment, it has become increasingly important to miniaturize and lighten all circuitry, and to decrease the power demands.

It is therefore the principal object of my invention to provide an improved synchronizing pulse generator.

It is another object of my invention to provide a synchronizing pulse generator which is extremely light, compact, and requires minimal power.

It is a further object of my invention to provide a novel electron tube for use in my improved sync generator.

The attainment of these objects will be realized from the following specification, taken in conjunction with the drawings, in which, Fig. 1 illustrates a tube of the rotating sheet-beam type which forms the heart of my invention;

My invention contemplates the use of an electron tube having its electrons formed into a sheet-like beam which is divided into sections. Various portions of the beam are caused to impinge upon collector anodes of specific size, shape, and location. The outputs of these anodes are selectively combined to produce the desired output pulse waveform.

Figures 2, 3A, 3B, 3C, 3D, 3E, 3F, 3G, 3H, 3I:
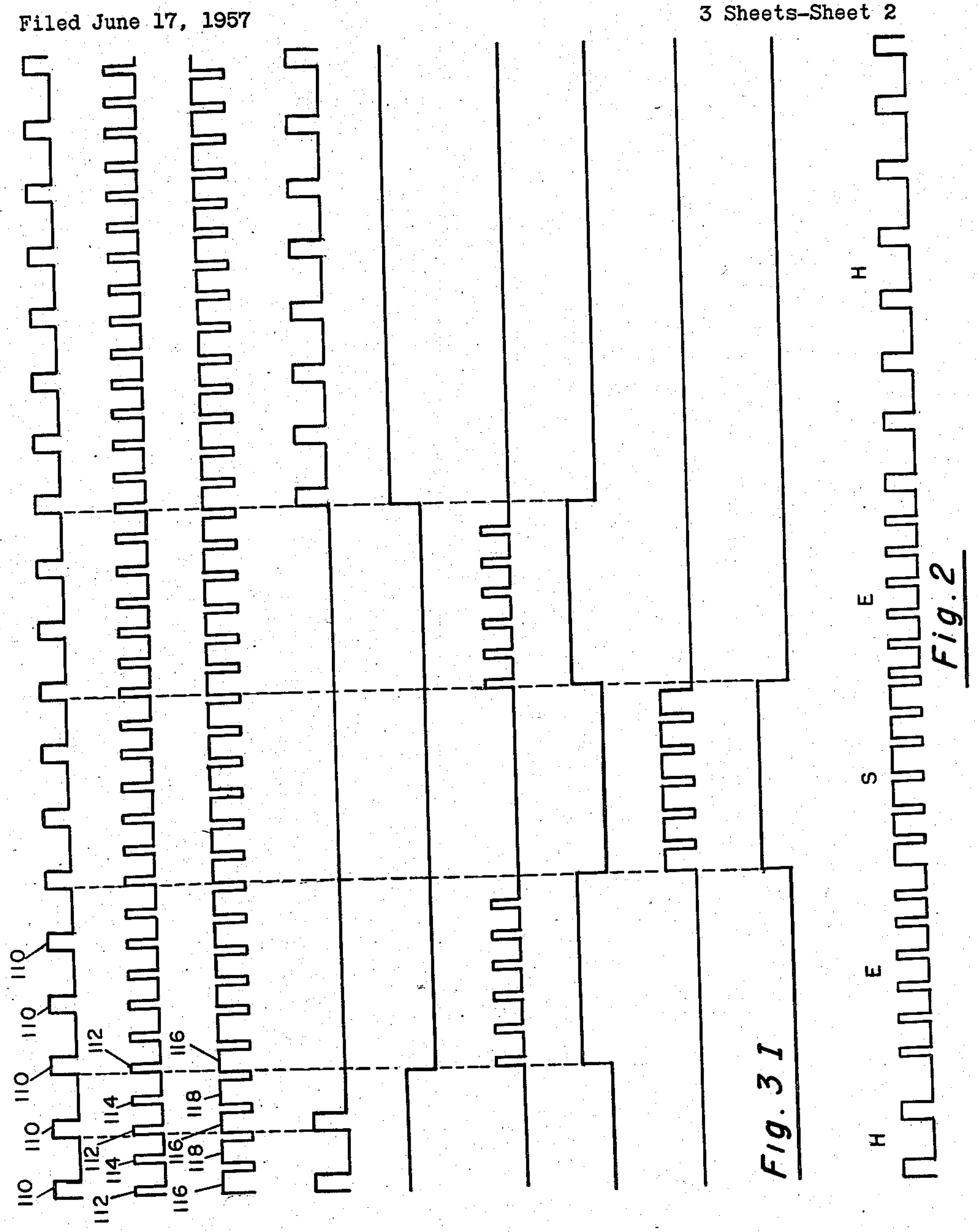
Fig. 2 illustrates the standardized synchronizing pulse waveform established by the National Television Standards Committee.
Fig. 3A through Fig. 3I illustrate various types of pulses and waveforms that are utilized.

Referring now to Fig. 2, there is shown a standardized synchronizing pulse waveform established for the television industry. Its characteristics and requirements are fully described in many publications, a particularly simple explanation being given on pages 282–283 of "Practical Television Engineering" by Scott Helt. As shown, the standardized synchronizing waveform comprises a train of horizontal pulses H (only the last two of a particular field being shown) followed by a series consisting of six equalizing pulses E, which are in turn followed by six serrated impulses S (which form the vertical synchronizing pulse), followed in turn by six more equalizing pulses E, whereupon the horizontal pulse train H is continuously produced until the time arrives for another series starting with equalizing pulses.

Thus, three types of synchronizing pulses are required. The first type H, the horizontal synchronizing pulses, occur at the rate of 15,750 per second and have a pulse width or duration of 5 microseconds. These occur once every horizontal scansion. The second type of synchronizing pulses E, the equalizing pulses, have a duration of 2.54 microseconds, and occur at a frequency of 31,500 times per second, which is double the frequency of the horizontal pulses. The third necessary synchronizing pulses S, the serrated impulses, have a pulse width or duration of 24.75 microseconds, the impulses occurring at a frequency of 31,500 times per second. As previously indicated, the six serrated pulses form the vertical synchronizing pulse which occurs at a rate of 60 per second and has a duration of 190.5 microseconds.

The horizontal sync pulses are used to control the receiver horizontal oscillator, the vertical sync pulses control the receiver vertical oscillator, and the equalizing pulses are utilized to achieve interlace. These functions are irrelevant to my invention, the explanation being given merely to afford background for the discussion which follows.

Rotating sheet beam tubes per se are well known in the art. Basically they comprise an axial cathode which is free to emit electrons in all directions. By means well known in the art, all the emitted electrons are caused to travel in the same direction, thus forming a sheet. Various potentials selectively applied to rotation control electrodes cause the sheet beam of electrons to rotate about the cathode in the manner of a revolving door. One way of obtaining rotation at a rate of 15,750 times per second is to use an oscillator of this frequency, utilizing two outputs, one of which has a 90 degree phase shift and to apply these separate outputs through push-pull amplifiers to rotation control electrodes. Since the principles of producing a rotating sheet beam of electrons are well known, the basic elements and circuitry thereof will not be shown.

By means which shall be hereinafter described, I divide the sheet beam of electrons into three sections, an upper, a middle, and a lower portion, all of which, however, rotate simultaneously as though they were one sheet. I also cause the beam to rotate at the particular rate of 15,750 times per second for reasons which I will hereinafter discuss.

The anodes of the basic rotating sheet beam tube take the form of arcuate, or longitudinal portions of a cylindrical surface. These terms will be best understood by visualizing a cylindrical surface having an axial cathode positioned on its geometrical axis. If the cylindrical surface is now divided by longitudinal slits which are parallel to the geometric axis, arcuate (or longitudinal) portions will be formed. Each portion will have a length equal to the length of the original cylinder, and a peripheral dimension determined by the spacing of the slits.

If a longitudinal portion is divided by slits which are perpendicular to the geometrical axis, "transverse" portions are formed which, taken together, make up a longitudinal portion. The transverse portions produced as described above will have equal peripheral dimensions, which are the same as the peripheral dimension of the longitudinal portion.

My invention involves the concept of longitudinal and transverse portions, except that the transverse portions will not be physically separated, and will not all have the same peripheral dimension. This concept, and the reason therefor, will become apparent from the following discussion.

Figure 1:
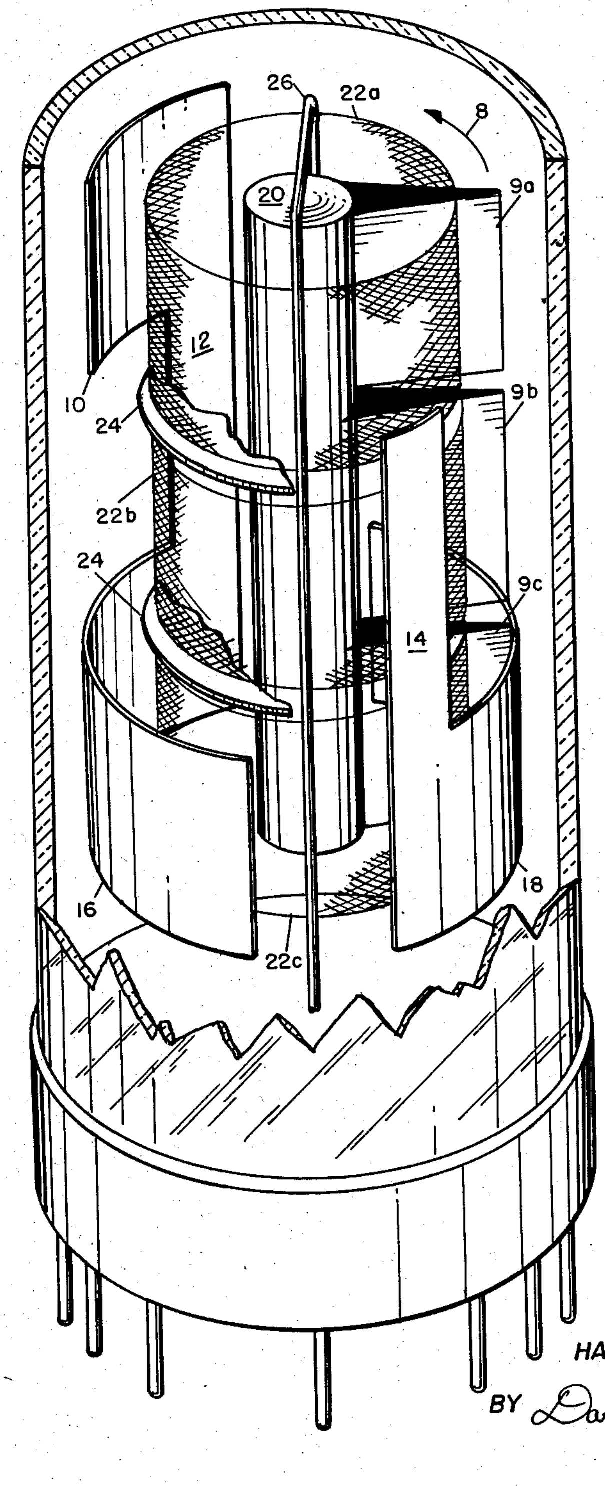

Referring now to Fig. 1, there is illustrated in diagrammatic form a rotating sheet beam tube, the specialized anodes and associated circuitry thereof forming the basis of my invention. It will be seen that as the sheet beam of electrons 9 rotates in the direction indicated by arrow 8, the upper section of the sheet 9a will impinge upon collector anode 10 once every revolution. The output of collector anode 10 is shown in Fig. 3A as pulses 110 which occur once every revolution, or at the rate of 15,750 per second, which is the line frequency of a television image. The duration of pulses 110 is determined by the speed of rotation of the sheet beam of electrons, which is fixed and the width of collector anode 10, which may be constructed to give a pulse of 5 microseconds' duration. It will be noted that these two factors (frequency and pulse width) meet the requirements of the horizontal synchronizing pulses H discussed in connection with Fig. 2. This will also explain why the sheet beam of electrons is caused to rotate 15,750 times per second.

Referring again to Fig. 1, it will be seen that the middle section **9*b* of the electron beam will impinge on anodes 12 and 14, and that the pulses caused by these impingements will occur twice every rotation. The pulses produced by the center section 9*b* of the beam are shown in Fig. 3B and identified by reference characters 112 and 114. It will be noted that these pulses occur at twice the frequency of pulses 110 and that they are narrower. As shown, the leading edge of pulse 112 occurs simultaneously with the leading edge of pulse 110, while the leading edge of pulse 114 occurs 180 degrees later. Their duration, which is determined by the width of anodes 12 and 14, may be made to equal 2.54 microseconds, and pulses 112 and 114** then satisfy the width and frequency requirements of the equalizing pulses E discussed in connection with Fig. 2.

Referring again to Fig. 1, it will be seen that the lower section **9*c* of the electron beam impinges upon anodes 16 and 18 and that the pulses caused by these impingements occur twice every revolution. The pulses formed when the electrons impinge on anodes 16 and 18 are shown in Fig. 3C as waveforms 116 and 118. It will be seen that pulses 116 and 118 start at the same time as pulses 110 and 112, and 114, respectively. Pulses 116 and 118** may have their width predetermined to equal 24.75 microseconds, and thus they fulfill the specifications for the serrated impulses S which constitute the vertical synchronizing pulse.

It will now be understood how my invention produces the three types of synchronizing pulses required by the standardized television signal.

From Fig. 1, it will be seen that anodes 10—18, whose configuration have been described, surrounded an axial cathode 20. A concentric control grid 22 is divided into three coaxial parts **22*a*, 22*b* and 22*c*. Means shown as barriers 24 but which may be either mechanical, electrostatic, or any other suitable configuration or combination, divide the sheet beam of electrons into a lower, a middle, and an upper section, each section being separately controlled by respective parts of control grid 22. In order to cause anodes 10—18** to produce their respective pulse waveforms, as shown in Fig. 3, for any desired interval of time, potentials applied to the separate control grid parts either cut off or permit the flow of electrons.

As was explained in connection with Fig. 2, every television field must be followed by the aforementioned series comprising six equalizing pulses, six serrated impulses, and six more equalizing pulses; and since there are 60 fields per second, this series must be initiated every $\frac{1}{60}$ of a second. Suitable circuitry for initiating the series will be hereinafter described. Once the initiation of this series has occurred, control grid **22*a* must be cut off to produce the requisite gap in the otherwise continuous train of horizontal synchronizing pulses, as shown in Fig. 3D. The waveform of the potential applied to control grid 22*a*** is shown in Fig. 3E. During the gapped interval of Fig. 3D, the above series is inserted.

Since this series comprises two bursts of six equalizing pulses each (shown in Fig. 3F), the control signal applied to grid section **22*b* takes the form shown in Fig. 3G. The only remaining portion of the series is the group of six serrated impulses shown in Fig. 3H, this burst requiring that the waveform of Fig. 3I be applied to control grid 22*c***.

It will thus be understood that the waveforms of Figs. 3E, 3G and 3I must be applied to control grid sections **22*a*, 22*b* and 22*c*** respectively, in the time relation shown, once the series has been initiated.

Figure 4:
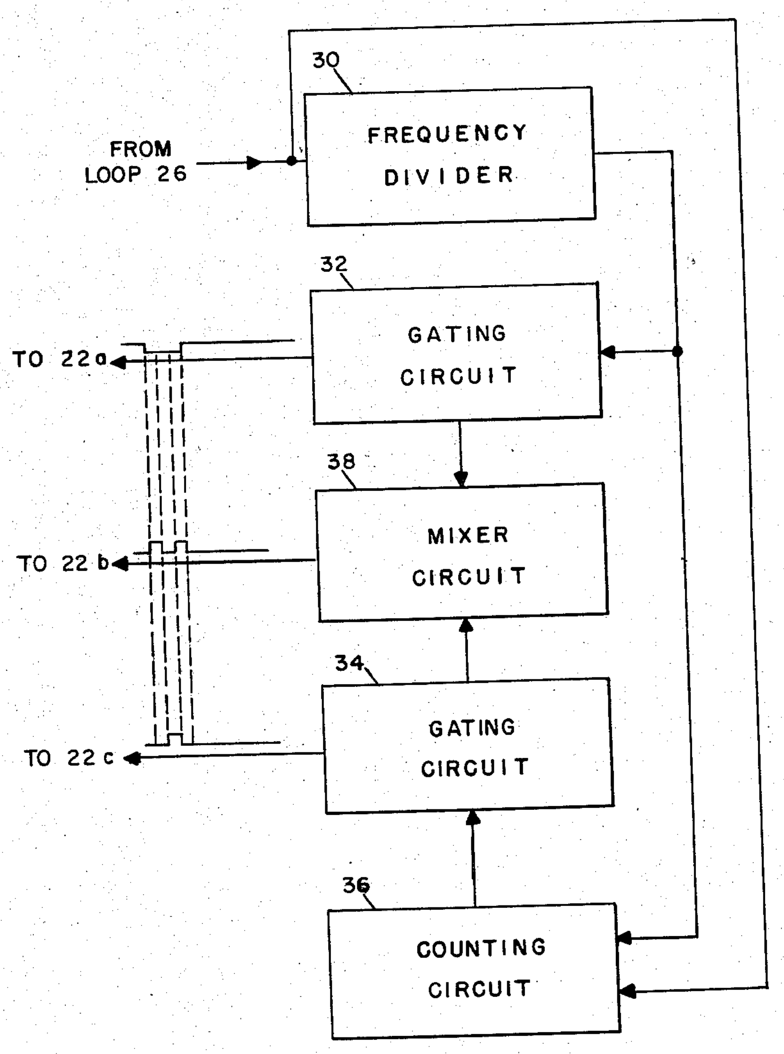
Fig. 4 illustrates, in block diagram form, the associated circuitry.

In order to accurately initiate this series I introduce into the structure of my tube, a wire loop 26 as shown in Fig. 1. The impingement of the electron beam on this loop produces very narrow pulses at a frequency of 31,500 times per second. These pulses are used, as shown by the block diagram of Fig. 4, to energize a frequency divider circuit 30 which produces a 60 cycle per second signal; and this signal is used for initiation of the series. Initiation of the series is accomplished by applying the output signal from frequency divider 30 to a gating circuit 32, which provides the required negative going control signal of Fig. 3E, which is applied to control grid **22*a*** to produce the requisite gap in an otherwise continuous train of horizontal synchronizing pulses as illustrated in Fig. 3D.

The control signal of Fig. 3I is readily produced by a second gating circuit 34. Since waveform 3I occurs later than waveform 3E, circuit 34 may accomplish this result by means of the output from frequency divider 30, and a delay circuit, or by utilizing a counting circuit 36 acting in conjunction with frequency divider 30 and the 31.5 kc. pulses. In either case, control signal 3I is applied to grid section **22*c*** to produce pulse waveform 3H.

Waveform 3G which is applied to control grid **22*b* may be achieved in a variety of ways. One relatively simple manner is to combine in mixer circuit 38, the negative going waveform 3E obtained from gating circuit 32, and positive going waveform 3I obtained from gating circuit 34, and then invert the resultant output, which will then be the same as waveform 3G. This waveform is then applied to control grid section 22*b*** to produce two bursts of equalizing pulses as shown in Fig. 3F. Other methods are known to those in the art, and circuits for pulse forming, counting, delaying, etc., are fully described in various publications, two such sources being "Electronics" by Elmore and Sands, chapter 4, and "Electronic Tube Circuits," by Seely, chapter 19.

The outputs of electrodes 10—18 are combined, and the composite result is the standardized synchronizing pulse waveform of Fig. 2. As previously indicated, the individual and/or composite output may, if desired, be modified, amplified, clipped, shaped, etc. by suitable circuitry.

While my invention has been described in terms of a pulse generator for television type signals, it may be seen that any desired pulse waveform may be produced. It is only necessary to modify the various parameters such as speed of rotation, anode configuration, width, number, and position. Under some conditions it may be desirable to maintain the same width but produce separate pulses having offset time relationship. This may be readily accomplished by proper spacing of a plurality of anodes having separate output terminals.

Having described the principles of my invention, and one embodiment thereof, it is apparent that those in related arts may devise various modifications thereof. I desire therefore to be limited not by the foregoing illustrations and examples, but rather by the claims granted to me.

What is claimed is:

1. A pulse generator comprising: an electron tube of the rotating sheet beam type; means to divide said beam into a plurality of sections; means to cut off selected said beam sections; a plurality of anodes, selected said anodes positioned to be swept by selected beam sections whereby pulses are produced; output terminals connected to said anodes; means to provide triggering pulses, said means comprising an anode positioned to be swept by said sheet beam; a plurality of gating circuits; means to energize said circuits by said triggering pulses; and means to apply the output of selected gating circuits to said beam section cutoff means.

2. The apparatus of claim 1 including means to combine the signals from said output terminals to provide a composite pulse waveform.

3. A generator of television synchronizing pulses, comprising: a tube of the rotating sheet beam type; means causing said beam to rotate at a predetermined rate; means to divide said beam into three sections; a first anode positioned to be swept by a first of said beam sections, said anode having such a predetermined transverse dimension that impingement by said first beam section produces a pulse whose duration corresponds to the standardized horizontal synchronizing pulse; a second and third anode positioned to be swept by said second of said beam sections, said anodes having such predetermined transverse dimensions and positions that impingement by said second beam section produces pulses whose duration and occurrence correspond to the standardized equalizing pulse; fourth and fifth anodes positioned to be swept by said third of said beam sections, said anodes having such predetermined transverse dimensions and positions that impingement by said third beam section produces pulses whose duration and occurrence correspond to the standardized serrated pulse.

4. The device of claim 3 including means to cut off individual beam sections.

5. The device of claim 4 including means to selectively combine the outputs from said anodes.

6. A pulse generator comprising: an electron tube of the rotating sheeting beam type; means dividing said beam into a plurality of sections; means causing each said section to produce a different pulse waveform, said means comprising anodes positioned to be swept by respective said beam sections, said anodes having such dimensions that impingement of selected anodes by given beam sections produces pulses of different duration and separation; output terminals connected to respective anodes whereby each said anode produces its own characteristic pulse waveform; means cutting off individual said beam sections for predetermined intervals whereby gapped pulse waveforms are produced at each said terminal; and means combining said gapped waveforms from said terminals to produce a single composite output signal.

References Cited in the file of this patent

UNITED STATES PATENTS

| | | |
|---|---|---|
| 2,053,268 | Davis | Sept. 8, 1936 |
| 2,239,749 | Varela | Apr. 29, 1941 |
| 2,293,368 | Stuart | Aug. 18, 1942 |
| 2,446,850 | Root | Aug. 10, 1948 |
| 2,474,960 | Skellett | July 5, 1949 |
| 2,521,504 | Dome | Sept. 5, 1950 |
| 2,580,672 | Graham | Jan. 1, 1952 |
| 2,721,895 | Spracklen | Oct. 25, 1955 |
| 2,796,549 | Fiske | June 18, 1957 |